United States Patent
Dutta et al.

(10) Patent No.: US 12,360,696 B2
(45) Date of Patent: Jul. 15, 2025

(54) COMMUNICATION OF DATA RELOCATION INFORMATION BY STORAGE DEVICE TO HOST TO IMPROVE SYSTEM PERFORMANCE

(71) Applicant: SK Hynix NAND Product Solutions Corp., Rancho Cordova, CA (US)

(72) Inventors: Bishwajit Dutta, Hillsboro, OR (US); Sanjeev N. Trika, Portland, OR (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 891 days.

(21) Appl. No.: 16/903,329

(22) Filed: Jun. 16, 2020

(65) Prior Publication Data

US 2020/0319815 A1 Oct. 8, 2020

(51) Int. Cl.
*G06F 3/00* (2006.01)
*G06F 3/06* (2006.01)

(52) U.S. Cl.
CPC .......... *G06F 3/0647* (2013.01); *G06F 3/0619* (2013.01); *G06F 3/064* (2013.01); *G06F 3/0656* (2013.01); *G06F 3/0659* (2013.01); *G06F 3/0679* (2013.01)

(58) Field of Classification Search
CPC ...... G06F 3/0608; G06F 3/064; G06F 3/0647; G06F 3/0679
See application file for complete search history.

(56) References Cited

U.S. PATENT DOCUMENTS

| | | | |
|---|---|---|---|
| 8,819,375 B1 * | 8/2014 | Pruett | G06F 13/28 707/693 |
| 10,176,212 B1 * | 1/2019 | Prohofsky | G06F 16/2365 |
| 10,552,340 B2 * | 2/2020 | Feehrer | G06F 3/0647 |
| 10,852,980 B1 * | 12/2020 | Specht | G06F 3/0647 |
| 2008/0010395 A1 | 1/2008 | Mylly et al. | |
| 2008/0155176 A1 | 6/2008 | Sinclair et al. | |
| 2014/0215129 A1 * | 7/2014 | Kuzmin | G06F 12/0246 711/103 |
| 2014/0359211 A1 * | 12/2014 | Bisht | G06F 12/0888 711/113 |
| 2019/0095110 A1 | 3/2019 | Watt | |
| 2019/0250845 A1 * | 8/2019 | Kabra | G06F 13/1673 |
| 2020/0081648 A1 | 3/2020 | Bernat et al. | |

OTHER PUBLICATIONS

EPO; Extended European Search Report issued in EP Patent Application No. 20216290.5, dated May 31, 2021; 10 pages.
"NVM Express Base Specification, NFM Express, Revision 1.4a," NVM Express Inc, Mar. 9, 2020 (405 pages submitted in 4 parts).

* cited by examiner

*Primary Examiner* — Reginald G Bragdon
*Assistant Examiner* — Michael L Westbrook
(74) *Attorney, Agent, or Firm* — Haley Guiliano LLP (57) ABSTRACT

An apparatus comprises a controller comprising an interface comprising circuitry to communicate with a host computing device; and a relocation manager comprising circuitry, the relocation manager to provide, for the host computing device, an identification of a plurality of data blocks to be relocated within a non-volatile memory; and relocate at least a subset of the plurality of data blocks in accordance with a directive provided by the host computing device in response to the identification of the plurality of data blocks to be relocated.

20 Claims, 4 Drawing Sheets

COMMUNICATION OF DATA RELOCATION INFORMATION BY STORAGE DEVICE TO HOST TO IMPROVE SYSTEM PERFORMANCE

BACKGROUND

A computer system may include one or more central processing units (CPUs) which may communicate with one or more storage devices. A CPU may include a processor to execute an operating system and/or other software applications that utilize a storage device coupled to the CPU. The software applications may write data to and read data from the storage device.

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include, e.g., a microcontroller, a digital signal processor (DSP), an SOC, a network computer (NetPC), a set-top box, a network hub, a wide area network (WAN) switch, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

Figure 1:
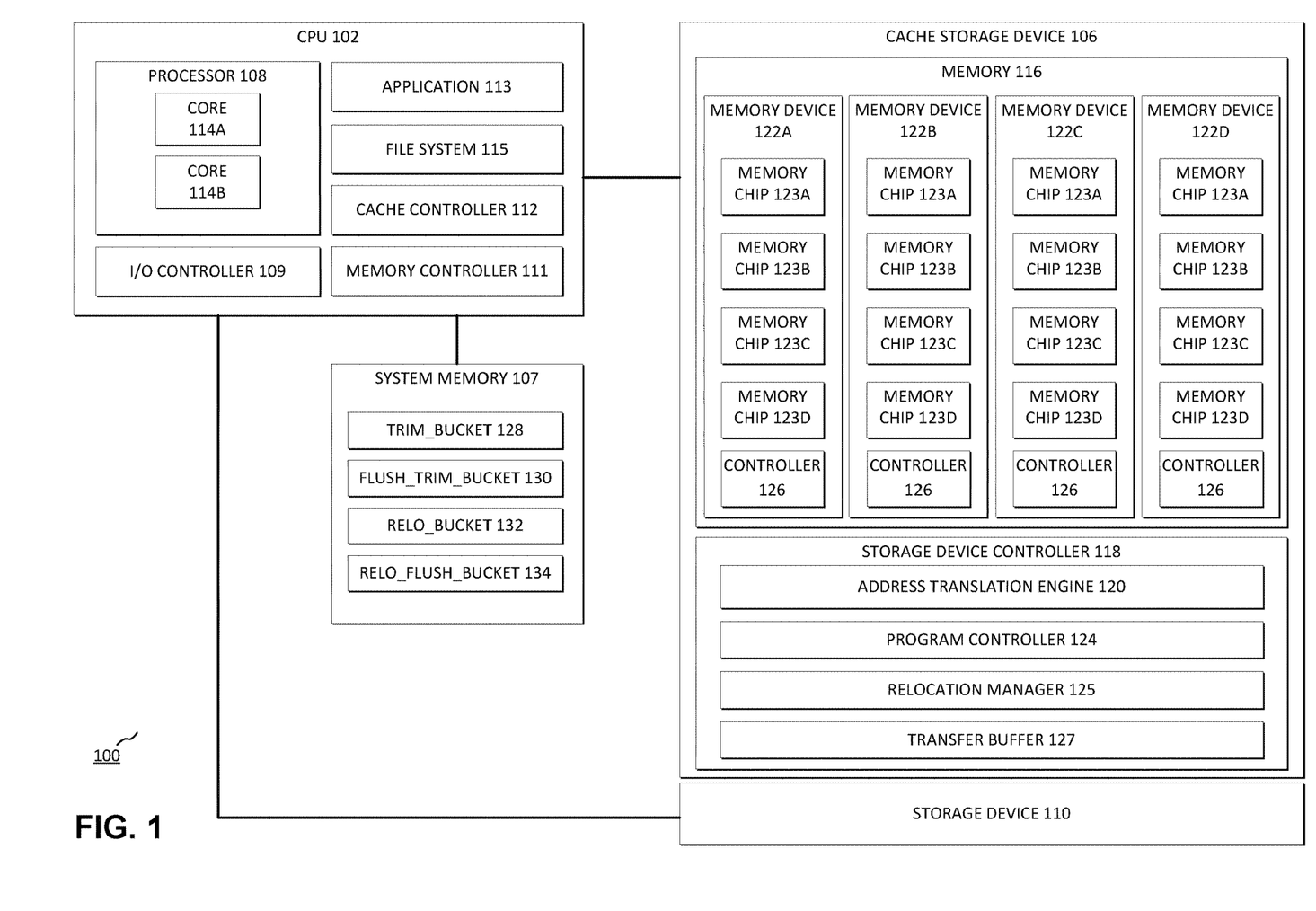
FIG. 1 illustrates a block diagram of a computer system in which relocation information is communicated by a cache storage device to a host in accordance with certain embodiments.

FIG. 1 illustrates a block diagram of a computer system 100 in which relocation information is communicated by a cache storage device 106 to a host (e.g., central processing unit (CPU) 102) in accordance with certain embodiments. System 100 includes a CPU 102 coupled to a cache storage device 106, a system memory device 107, and a storage device 110. During operation, data may be transferred between the CPU 102 and one or more of cache storage device 106, system memory device 107, and storage device 110. In some instances, data may be transferred directly between two or more of cache storage device 106, system memory device 107, and storage device 110. In various embodiments, particular data operations (e.g., erase, program, and read operations) or other communications involving the cache storage device 106, system memory device 107, or storage device 110 may be managed by one or more of an operating system (e.g., via file system 115) or other software application (e.g., cache controller 112) executed by processor 108.

Caching is a technique to provide performance and cost benefits to end-users. For example, a system memory (e.g., dynamic random access memory (DRAM)) may be used to cache disk data. Alternatively, a fast storage device (e.g., a solid state drive (SSD) or a storage device such as a dual in-line memory module (DIMM) that comprises 3D crosspoint memory) may be used to cache data of slower storage devices (e.g., hard disk drives (HDDs)). When data that is not currently cached by the host computing device is requested by an application executed by the host, the data may be retrieved from the slower storage device and then stored in memory that may be accessed more easily by the host. For example, data retrieved from the slower storage device (e.g., a hard disk drive (HDD)) may be cached by storing the retrieved data in a cache storage device (e.g., SSD), a system memory device (e.g., DRAM), and/or one or more lower level caches of the CPU. After the data is cached, the data may be retrieved from one of the caches rather than the slower storage device, thus reducing the amount of latency for data accesses by the host.

Many storage devices (e.g., SSDs comprising NAND non-volatile memory) include an indirection structure for data in which logical block addresses (LBAs) used by the host are mapped to physical addresses of the storage device. The storage device may relocate physical data within the storage device in the background (e.g., independent of a specific command to do so from the host) using an operation known as "defrag" (which is shorthand for "defragmentation") This process helps maintain good write performance, while satisfying various media-management constraints. A defrag operation moves multiple blocks of valid source data in a source band to a destination band, where a data block may refer to any suitable grouping of data. Background relocation of data blocks can be triggered due to numerous reasons, such as data invalidity levels, background data refresh, read disturb, NAND errors, preemptive error handling, or other reasons. Since defrag operations introduce additional reads and writes internally on the storage drive, they increase read and write amplification and reduce the storage drive's write-performance and endurance.

In configurations in which a storage device is used as a cache, relocation within the storage device is wasteful when the data being moved is stale within the cache or is about to be evicted from the cache. In configurations in which the storage device is used as the backing store and faster memory (such as DRAM, 3D crosspoint memory (e.g., 3D XPoint™), or other byte accessible non-volatile memory such as magnetoresistive random-access memory (MRAM)) is used as the caching media, the defrag operations on the storage device provide an opportunity to eliminate a media-read operation to perform a prefetch or a cacheline-insert, as the storage device needs to perform a read operation anyways as part of the defrag operation, and the same read operation can proactively provide the data for storage in the caching media (whether indirectly to the caching media through a cache controller or directly to the caching media via a peer to peer communication) for cache-insertion without requiring a separate data read operation.

Storage devices such as SSDs may also benefit from a "trim" or similar operation that advise the storage device that data at specified LBAs is no longer needed. For example, when a user deletes a file, the operating system may send a trim command to a controller of the storage devil indicating the data blocks (e.g., LBA region) that can be erased when garbage collection takes place on the storage device. The storage device may then optimize defrag operations such that the data specified in the trim operation is not moved (as it is no longer valid). Many systems determine and issue trim commands, but there may be a time lag between the issuance of the trim commands and associated defrag operations. For example, a system may issue trim commands nightly to one or more storage devices. However, defrag operations performed by the storage devices during the day may not be able to utilize associated trim operations to minimize data movement.

Various embodiments of the present disclosure boost storage device performance and endurance by allowing the storage device (e.g., SSD) to send relocation information to the host. In some embodiments, this communication is accomplished through Non-Volatile Memory Express (NVMe) Asynchronous Event Request-Notification or similar commands. The NVM Express revision 1.3 and prior revisions define a register level interface for host software to communicate with a non-volatile memory subsystem over PCI Express (NVMe™ over PCIe™). The NVMe™ over Fabrics specification defines a protocol interface and related extensions to the NVMe interface that enable operation over other interconnects (e.g., Ethernet, InfiniBand™, Fibre Channel). The NVMe over Fabrics specification has an NVMe Transport binding for each NVMe Transport (either within that specification or by reference). The NVMe specifications may be obtained at https://nvmexpress.org/resources/specifications/.

Depending on the data being moved and the cache policy dictating whether to keep, evict, or prefetch the data, caching logic can trim the blocks prior to relocation or opportunistically cache the blocks on relocation reads. In some embodiments, file systems may also use such notifications to issue trim commands with fine time-granularity. Various embodiments may allow information about relocation of data to inform various I/O operations initiated by the host including cache lazy-writes, cache prefetches, host file deletions from recycle bins, and triggering of SSD trim operations. Providing defrag relocation information to a host can reduce SSD relocations during I/O busy periods, thus boosting performance and endurance while allowing opportunistic caching and prefetching during relocation reads. Various technical advantages of some embodiments may include eliminating relocation waste, accelerating prefetches, improving cache hit-rates (and hence system level performance), and reducing internal write-amplification (and thus write-performance and endurance).

FIG. 1 illustrates an embodiment in which a cache storage device 106 caches data of another storage device 110. While the cache storage device 106 may be any suitable storage device, in some embodiments, the cache storage device 106 is an SSD or a NVDIMM comprising byte addressable non-volatile memory such as 3D crosspoint, MRAM, or other type of byte accessible non-volatile memory. Cache controller 112 may manage the caching of data from storage device 110 on cache storage device 106. The cache controller 112 and other components of system 100 will be described in greater detail below. Example operation of system 100 is described with reference to FIG. 2.

Figure 2:
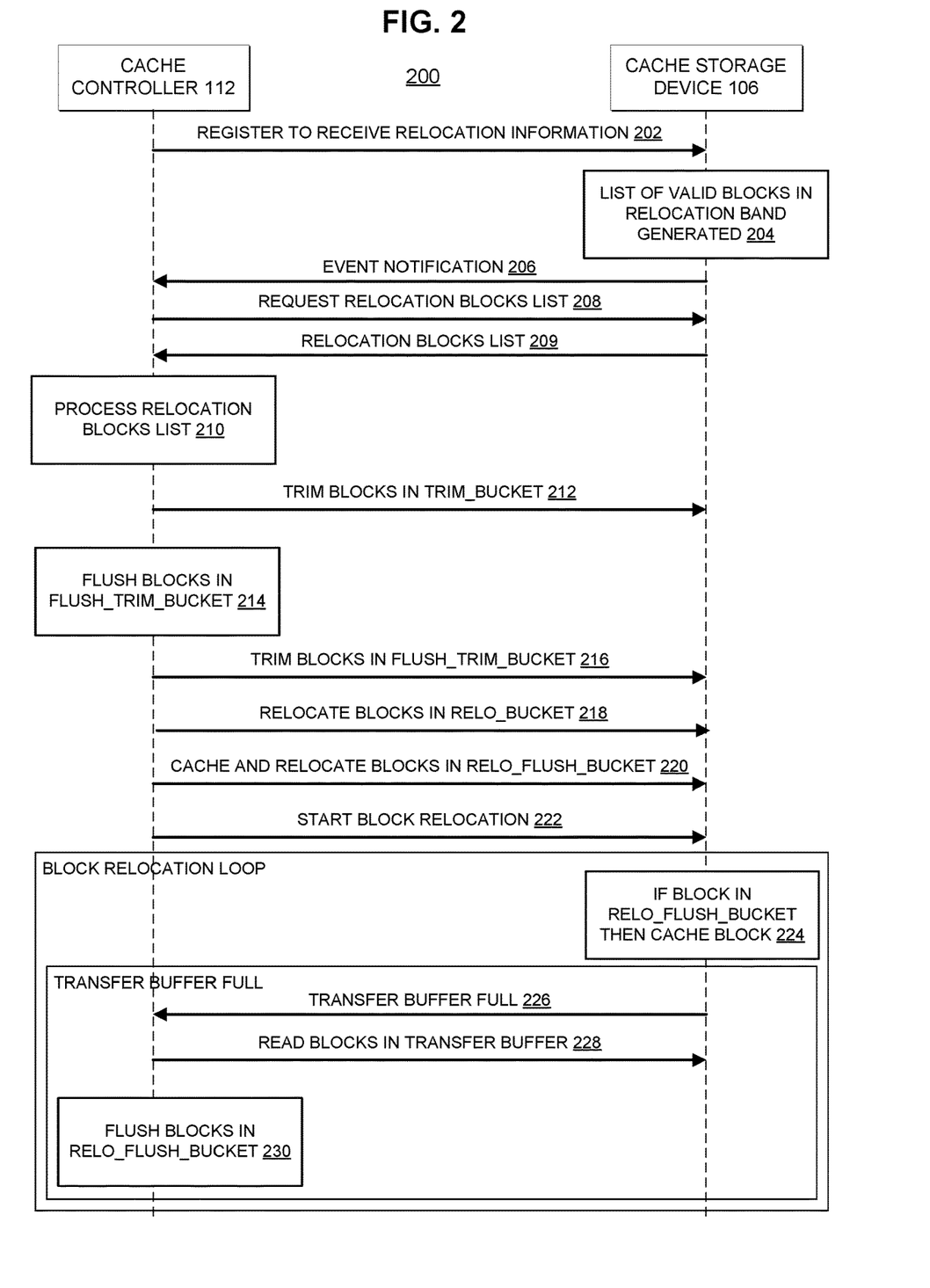
FIG. 2 illustrates an example flow for communicating relocation information from a cache storage device to a host in accordance with certain embodiments.

FIG. 2 illustrates an example flow 200 for communicating relocation information from the cache storage device 106 to a host (e.g., CPU 102) in accordance with certain embodiments. In this flow, the cache controller 112 operates on behalf of the CPU 102 to communicate with the cache storage device 106, though in other embodiments the communications and operations depicted may be performed by any suitable components of system 100.

The flow begins at 202 as the cache controller 112 registers with the cache storage device 106 to receive relocation information from the cache storage device 106. The registration request may take any suitable format. In one embodiment in which the cache storage device 106 implements an NVMe interface, the registration request may comprise an Asynchronous Event Request command (which is part of the NVMe Admin Command Set) with an opcode of 0x0C, e.g., as defined in NVM Express Base Specification, Revision 1.4a or other suitable NVMe specification (current or future). The event type of the command may be set to "Vendor Specific event." In general, the Asynchronous Event Request command is transmitted by software of the host to the cache storage device 106 to enable the reporting of asynchronous events from a storage device controller 118 of the cache storage device 106.

At 204, a list of valid blocks in a relocation band are generated by the cache storage device 106. This list may be generated responsive to the triggering of a relocation of data within the cache storage device 106 (e.g., as part of a defrag operation). The list includes an identification of the blocks that are to be moved during the relocation. The list may have any suitable format that specifies one or more blocks of data that are to be moved, such as identifiers of individual blocks, ranges of blocks, or other suitable identifiers. In one embodiment, the list may comprise a bitmap indicating which blocks are to be relocated. In various embodiments, the blocks may be identified in the list using any suitable designations, such as LBAs or indirection units (IUs) (or representations thereof), where an IU may be a single LBA (e.g., 512 bytes or other size) or any suitable number of LBAs (e.g., 128 LBAs).

When the cache storage device 106 triggers a relocation of blocks, it notifies the cache controller 112 and then postpones the relocation until it receives a response including directives for the blocks. In some embodiments, if no response is received from the host within a timeout period, the cache storage device 106 relocates all of the blocks in the list.

At 206, an event notification associated with the relocation of data blocks is sent from the cache storage device 106 to the cache controller 112. In some embodiments, the event notification may indicate that a list of relocation blocks is available. As an example, when the NVMe interface is used, the storage device controller 118 of the cache storage device 106 may post a completion queue entry to an Admin Completion Queue when there is an asynchronous event (in this case a list of relocation blocks has been generated) to report to the host.

At 208, the cache controller 212 requests the relocation blocks list from the cache storage device 106. In one example, when the NVMe interface is used, this request may include a Get Log Page command for a vendor-specific log page that includes the list of relocation blocks. In other embodiments, the request may take any suitable format. At 209, the relocation blocks list is provided to the cache controller 112. In some embodiments, the event notification 206 may alternatively include the list of the relocation blocks (as opposed to a notification that an asynchronous event has occurred), such that cache controller 112 does not need to subsequently request the blocks. In various embodiments, the cache controller 112 may receive a relocation block list from the cache storage device 106 each time the cache storage device 106 triggers a relocation.

At 210, the cache controller 112 processes the relocation blocks list. In a particular embodiment, the cache controller 112 may assign each block to be relocated to one of a set of buckets (e.g., by assigning a tag to each block or otherwise associating the assigned bucket with the block). In various embodiments, the buckets may be organized around the following guidelines. First, if a block has not been used (e.g., read by or written to by the host) recently, then it does not need to be included in the cache storage device 106 (as a cache is designed to store data that is expected to be used by the CPU in the near future). In various embodiments, whether a block has been recently used may be a binary decision based, e.g., on whether the block is included within a queue of recently used blocks or based on an indication of the time since the last usage of the block (e.g., this indication may change values over time and may be reset when the block is accessed). Second, if data is dirty (e.g., the data has been modified at the cache storage device 106 but has not been updated at the storage device 110) then the data should be read from the cache storage device 106 and updated in the storage device 110.

In the depicted embodiment of FIG. 1, the cache controller 112 assigns blocks to four buckets: trim_bucket 128, flush_trim_bucket 130, relo_bucket 132, and relo_flush_bucket 134. In the embodiment depicted, these buckets are stored in system memory 107, although in other embodiments the buckets may be stored in any suitable memory of the system 100, such as a cache of the CPU 102, a storage location dedicated to the buckets, or other suitable memory location. In one embodiment, during processing of the blocks at 210, each block is assigned to one of these buckets.

If the block is not dirty and is not recently used, the block is assigned to the trim_bucket 128 for deletion from the cache storage device 106. If the block is dirty and not recently used, the block is assigned to the flush_trim_bucket 130 for flushing to the storage device 110 and trimming from the cache storage device 106. If the block is not dirty but has been used recently, the block is added to the relo_bucket 132 for the cache storage device 106 to relocate. Finally, if the block is dirty but has been used recently, the block is assigned to the relo_flush_bucket 134 so that the block can be relocated within cache storage device 106 as well as flushed to the storage device 110 at a suitable time (e.g., it may be written to the storage device 110 in the background in a lazy manner when bandwidth is available). The read performed at the cache storage device 106 as part of the data relocation process may be used opportunistically to obtain the data to be flushed to the storage device 110.

After processing the blocks with respect to the buckets, the cache controller 112 instructs the cache storage device 106 with directives regarding the blocks marked for relocation. For example, at 212 a request is sent to the cache storage device 106 to trim the blocks in the trim_bucket 128. As described earlier, a trim command indicates to cache storage device 106 that the blocks are not needed and thus may be excluded from the relocation.

At 214, the cache controller 112 initiates a request to flush the blocks in the flush_trim_bucket 130 to the storage device 110 (this part of the flow may also include a corresponding read command from the host to the cache storage device 106 to obtain the data to be flushed to the storage device 110). In addition, at 216 a request is sent to the cache storage device 106 to trim the blocks in the flush_trim_bucket 130.

At 218, a request to relocate blocks in the relo_bucket 132 is sent to the cache storage device 106.

At 220 a request to cache and relocate the blocks in relo_flush_bucket 134 is sent to the cache storage device. This request instructs the cache storage device 106 to relocate the blocks in the relo_flush_bucket 134 and to leave the read data corresponding to these blocks in a transfer buffer 127 so that they may be read by the host without having to initiate a standard read operation to read the blocks from their original or relocated location. For example, when the cache storage device 106 relocates data, it may first read the data from its present location into a transfer buffer 127 and then write the data from the transfer buffer 127 to its relocated destination. In various embodiments, the transfer buffer 127 may comprise a type of memory (e.g., DRAM or SRAM) that allows for faster access than the type of memory (e.g., NAND flash or 3D Crosspoint) used to persistently store data by the cache storage device 106. Thus, the cache storage device 106 may utilize the read that it performs during the relocation to make the data more easily available to the host via the transfer buffer 127.

After (or concurrent with) providing directives for the blocks in the various buckets, the cache controller 112 instructs the cache storage device 106 that it may start block relocation of the remaining valid blocks (e.g., the blocks that were not removed from the list by the cache controller 112 via requests 212 and 216) at 222.

As the cache storage device 106 relocates the blocks, it may loop through the blocks checking to see whether the blocks being relocated are in the relo_flush_bucket 134. If a particular block is in this bucket, then it is cached in the transfer buffer 127 of the cache storage device 106 during the relocation process. If the transfer buffer is full, then a notification of such is sent to cache controller 112 at 226. If the transfer buffer is not full yet after placement of a block in the transfer buffer, the loop continues and when an additional block assigned to the relo_flush_bucket 134 is encountered, this block may also be read into the transfer buffer as it is relocated, and so on until the transfer buffer is full. Once the cache controller 112 is notified that the buffer is full, it reads the blocks in the buffer at 228 and then flushes the read blocks to the storage device 110 at 230. If the buffer is not full, but the relocation operation has completed, the cache storage device 106 may notify the cache controller of such, and the cache controller 112 may read any remaining blocks in the transfer buffer and flush these to the storage device 110.

In another embodiment, instead of reading the blocks of the relo_flush_bucket 134 from the transfer buffer 127 after relocation read operations, the cache controller 112 may issue a read and relocation request (which in one embodiment could be included in a single command, such as an NVMe vendor-specific command) to the cache storage device 106 to perform a standard read operation on the blocks of the relo_ flush_bucket 134 and to instruct the cache storage device 106 to relocate the blocks in the relo_flush_bucket 134. In any event, once the data read is available, the cache controller 112 may flush the data to the storage device 110.

The flow described in FIG. 2 is merely representative of operations that may occur in particular embodiments. Operations may be performed in any suitable order without departing from the scope of particular embodiments. In other embodiments, additional operations may be performed in the flow. Some of the operations illustrated in FIG. 2 may be repeated, combined, modified, or deleted where appropriate. For example, any one or more of 212, 216, 218, 220, and 222 may be combined within a single command sent from the cache controller 112 to the cache storage device 106 (which in one embodiment could be a NVMe vendor-specific command). As another example, 212 and 216 may be included within the same trim command and 218, 220, and 222 may be combined in another command (which in one embodiment could be a NVMe vendor-specific command). In other embodiments, a single command from the cache controller 112 may specify the blocks that are not to be relocated (and thus should be removed from the initial block relocation list received from the cache storage device 106) or may specify the blocks that are to be relocated. In various embodiments, that same command (or a different command) may specify which blocks are to be cached during the relocation.

Returning again to FIG. 1, CPU 102 comprises a processor 108, such as a microprocessor, an embedded processor, a digital signal processor (DSP), a network processor, a handheld processor, an application processor, a co-processor, an SOC, or other device to execute code (i.e., software instructions). Processor 108, in the depicted embodiment, includes two processing elements (cores 114A and 114B), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

Application 113 may be executed by CPU 102 to perform any suitable operations. The application may be associated with application code that is executed by the processor 108. The application code may be stored within storage device 110, cache storage device 106, and/or system memory 107 during various stages of operation of system 100. The application may request data stored within storage device 110, cache storage device 106, and/or system memory 107 through file system 115.

File system 115 makes stored data visible to an application 113 (e.g., by organizing storage in a hierarchical namespace). File system 115 may manage access to both the content of files and metadata about those files. File system 115 may receive system calls from the application 113 for data stored by computing system 100. The file system 115 may be part of an operating system executed by CPU 102. File system 115 may represent any suitable file system, such as a File Allocation Table (FAT), New Technology File System (NTFS), Resilient File System (ReFS), HFS+, a native Linux file system, or other suitable file system.

Cache controller 112 may receive data read and write requests and may determine how to complete these requests from or to the cache media (e.g., cache storage device 106) and the backing-store media (e.g., storage device 110). The cache controller may perform any other suitable functions, such as coordinating background operations (e.g., lazy writes) to keep the two media synchronized, managing mappings to data and metadata associated with the data, flushing data before dirty data is deleted from the cache storage device 106, or managing prefetching of data into the cache storage device 106.

In various embodiments, the cache controller 112 may utilize I/O controller 109 to communicate with cache storage device 106 or storage device 110. For example, the cache controller 112 may send a request to the I/O controller 109 and the I/O controller 109 may transmit the request to the cache storage device 106 or storage device 110. Similarly, the I/O controller 109 may receive communications from the cache storage device 106 or storage device 110 and provide the communications to the cache controller 112.

I/O controller 109 is an integrated I/O controller that includes logic for communicating data between CPU 102 and I/O devices. In other embodiments, the I/O controller 109 may be on a different chip from the CPU 102. I/O devices may refer to any suitable devices capable of transferring data to and/or receiving data from an electronic system, such as CPU 102. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a cache storage device 106 or storage device 110 that may be coupled to the CPU 102 through I/O controller 109.

An I/O device may communicate with the I/O controller 109 of the CPU 102 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 109 and an associated I/O device may communicate data and commands in accordance with a logical device interface specification such as NVMe (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller 109 may be located off-chip (e.g., not on the same chip as CPU 102) or may be integrated on the same chip as the CPU 102.

Memory controller 111 is an integrated memory controller that controls the flow of data going to and from one or more system memory devices 107. Memory controller 111 may include logic operable to read from a system memory device 107, write to a system memory device 107, or to request other operations from a system memory device 107. In various embodiments, memory controller 111 may receive write requests from cores 114 and/or I/O controller 109 and may provide data specified in these requests to a system memory device 107 for storage therein. Memory controller 111 may also read data from a system memory device 107 and provide the read data to I/O controller 109 or a core 114. During operation, memory controller 111 may issue commands including one or more addresses of the system memory device 107 in order to read data from or write data to memory (or to perform other operations). In some embodiments, memory controller 111 may be implemented on the same chip as CPU 102, whereas in other embodiments, memory controller 111 may be implemented on a different chip than that of CPU 102. I/O controller 109 may perform similar operations with respect to one or more cache storage devices 106 or storage devices 110.

A system memory device 107 may store any suitable data, such as data used by processor 108 to provide the functionality of computer system 100. For example, data associated with programs that are executed or files accessed by cores 114 may be stored in system memory device 107. Thus, a system memory device 107 may include a system memory that stores data and/or sequences of instructions that are executed or otherwise used by the cores 114. In various embodiments, a system memory device 107 may store temporary data, persistent data (e.g., a user's files or instruction sequences) that remains stored even after power to the system memory device 107 is removed, or a combination thereof. A system memory device 107 may be dedicated to a particular CPU 102 or shared with other devices (e.g., one or more other processors or other devices) of computer system 100.

In various embodiments, a system memory device 107 may include a memory comprising any number of memory arrays, a memory device controller, and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as DRAM or static random-access memory (SRAM). One particular type of DRAM that may be used in a memory array is synchronous dynamic random-access memory (SDRAM).

In particular embodiments, any portion of memory 107 (e.g., a portion of volatile memory) may comply with one or more portions of a standard promulgated by JEDEC for SDRAM memory, such as JESD79F for Double Data Rate (DDR) SDRAM, JESD79-2F for DDR2 SDRAM, JESD79-3F for DDR3 SDRAM, JESD79-4A for DDR4 SDRAM, or a Low Power DDR standard (e.g., LPDDR4) (these standards are available at www.jedec.org). Such standards (and similar standards) may be referred to as DDR-based standards.

A cache storage device 106 or storage device 110 may store any suitable data, such as data used by processor 108 to provide functionality of computer system 100. For example, data associated with programs that are executed or files accessed by cores 114A and 114B may be stored in cache storage device 106 or storage device 110. Thus, in some embodiments, a cache storage device 106 or storage device 110 may store data and/or sequences of instructions that are executed or otherwise used by the cores 114A and 114B. In various embodiments, a cache storage device 106 or storage device 110 may store persistent data (e.g., a user's files or software application code) that remains stored even after power to the cache storage device 106 or storage device 110 is removed. A cache storage device 106 or storage device 110 may be dedicated to CPU 102 or shared with other devices (e.g., another CPU or other device) of computer system 100.

In the embodiment depicted, cache storage device 106 includes a storage device controller 118 and a memory 116 comprising four memory devices 122A-D operable to store data, however, a cache storage device may include any suitable number of memory devices. A cache storage device 106 may include any number of memories 116 and each memory 116 may include any number of memory devices 122 (e.g., 122A-D). In a particular embodiment, a memory device 122 may be or comprise a semiconductor package with one or more memory chips 123 (e.g., memory chips 123A-D). In the embodiment depicted, memory 116 includes memory devices 122A-D (while specific references herein may be made to memory device 122A, the other memory devices may have any suitable characteristics of memory device 122A) and memory device controller 126.

A memory device 122A (e.g., each memory chip of the memory device) includes a plurality of memory cells that are each operable to store one or more bits. The cells of a memory device 122A may be arranged in any suitable fashion, such as in rows (e.g., wordlines) and columns (e.g., bitlines), three dimensional structures, and/or other manner. In various embodiments, the cells may be logically grouped into banks, blocks, subblocks, planes, wordlines, pages, frames, bytes, or other suitable groups.

A memory device 122A may include any of the volatile or non-volatile memories listed above or other suitable memory. In particular embodiments, memory device 122A includes non-volatile memory, such as planar or 3D NAND flash memory. In particular embodiments, a memory device 122A with non-volatile memory may comply with one or more standards for non-volatile memory promulgated by JEDEC, such as JESD218, JESD219, JESD220-1, JESD220C, JESD223C, JESD223-1, or other suitable existing or future standard (the JEDEC standards cited herein are available at www.jedec.org).

In various embodiments, a cache storage device 106 comprises NAND flash memory (herein a storage device comprising NAND flash memory is referred to as a NAND flash storage device). In some embodiments, cache storage device 106 may be a solid-state drive; a memory card; a Universal Serial Bus (USB) flash drive; or memory integrated within a device such as a smartphone, camera, media player, or other computing device. In general, storage devices with NAND flash memory are classified by the number of bits stored by each cell of the memory. For example, a single-level cell (SLC) memory has cells that each store one bit of data, a multi-level cell (MLC) memory has cells that each store two bits of data, a tri-level cell (TLC) memory has cells that each store three bits of data, a quad-level cell (QLC) memory has cells that each store four bits of data, and a penta-level cell (PLC) memory has cells that each store five bits of data, though some memories may utilize multiple encoding schemes (e.g., MLC and TLC) on the same array or on different arrays of the same device.

In a particular embodiment, a memory device 122 is a semiconductor package. In various embodiments, a semiconductor package may comprise a casing comprising one or more semiconductor dies (also referred to as chips), such as memory chips 123A-D. A package may also comprise contact pins or leads used to connect to external circuits. However, a package is merely one example form a memory device 122 may take as a memory device may be any suitable arrangement of one or more memory arrays and associated logic in any suitable physical arrangement. For example, although a single physical package may include a single memory device 122, multiple memory devices 122 could be resident on a single package or a memory device 122 could be spread across multiple packages.

A memory 116 may be embodied in one or more different physical mediums, such as a circuit board, die, disk drive, other medium, or any combination thereof (or combination with one or more packages). In a particular embodiment, memory 116 comprises a circuit board coupled to a plurality of memory devices 122 that each comprise a semiconductor package.

In various embodiments, storage device 110 may include any suitable characteristics described above with respect to cache storage device 106. In some embodiments, the storage device 110 may comprise a disk driver that stores more data than cache storage device 106, but is slower to access.

Cache storage device 106, system memory device 107, and storage device 110 may comprise any suitable types of memory and are not limited to a particular speed, technology, or form factor of memory in various embodiments. For example, a cache storage device 106 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Similarly, system memory 107 or storage device 110 may have any suitable form factor. Moreover, computer system 100 may include multiple different types of storage devices.

System memory device 107, cache storage device 106, or storage device 110 may include any suitable interface to communicate with memory controller 111 or I/O controller 109 using any suitable communication protocol such as a DDR-based protocol, PCI, PCIe, USB, SAS, SATA, FC, System Management Bus (SMBus), or other suitable protocol. In some embodiments, a system memory device 107, cache storage device 106, or storage device 110 may include a communication interface to communicate with memory controller 111 or I/O controller 109 in accordance with any suitable logical device interface specification such as NVMe, AHCI, or other suitable specification. In particular embodiments, system memory device 107, cache storage device 106, or storage device 110 may comprise multiple communication interfaces that each communicate using a separate protocol with memory controller 111 and/or I/O controller 109.

Storage device controller 118 may include logic to receive requests from CPU 102 (e.g., via an interface that communicates with memory controller 111 or I/O controller 109), cause the requests to be carried out with respect to a memory 116 (or memory devices(s) and/or memory chip(s) thereof), and provide data associated with the requests to CPU 102 (e.g., via memory controller 111 or I/O controller 109). Storage device controller 118 may also be operable to detect and/or correct errors encountered during memory operation. In an embodiment, controller 118 also tracks the number of times particular cells (or logical groupings of cells) have been written to in order to perform wear leveling and/or to detect when cells are nearing an estimated number of times they may be reliably written to. In performing wear leveling, the storage device controller 118 may evenly spread out write operations among blocks of the memory of a memory 116 such that particular blocks are not written to more than other blocks. In various embodiments, controller 118 may also monitor various characteristics of the cache storage device 106 such as the temperature or voltage and report associated statistics to the CPU 102. Storage device controller 118 can be implemented on the same circuit board or device as a memory 116 or on a different circuit board, or device. For example, in some environments, storage device controller 118 may be a centralized storage controller that manages memory operations for multiple different memories 116 (which may each be of the same type of memory or may be of different types) of computer system 100 (and thus may provide storage device controller functionality described herein to any of the memories to which it is coupled).

In various embodiments, the cache storage device 106 also includes an address translation engine 120. In the depicted embodiment, the address translation engine 120 is shown as part of the storage device controller 118, although in various embodiments, the address translation engine 120 may be separate from the storage device controller 118 and communicably coupled to the storage device controller 118. In various embodiments, the address translation engine 120 may be integrated on the same chip or package as the storage device controller 118 or on a different chip or package.

In various embodiments, address translation engine 120 may include logic to store and update a mapping between a logical address space (e.g., an address space visible to a host computing device coupled to the cache storage device 106) and the physical address space of the memory 116 of the cache storage device 106 (which may or may not be exposed to the host computing device). The logical address space may expose a plurality of logical groups of data which are physically stored on corresponding physical groups of memory addressable through the physical address space of the cache storage device 106. A physical address of the physical address space may comprise any suitable information identifying a physical memory location (e.g., a location within a memory array of a memory 116) of the cache storage device 106, such as an identifier of the memory 116 on which the physical memory location is located, an identifier of the memory device 122A on which the physical memory location is located, one or more pages of the physical memory location, one or more subblocks of the physical memory location, one or more wordlines of the physical memory location, one or more bitlines of the physical memory location, or other suitable identifiers or encodings thereof.

In various embodiments, the cache storage device 106 also includes program control logic 124 which alone or in combination with a controller 126 of a memory device 122 is operable to control the programming sequence performed when data is written to a memory 116, the read sequence performed when data is read from a memory 116, or an erase sequence when data is erased from a memory 116. In various embodiments, program control logic 124 may provide the various voltages (or information indicating which voltages should be provided) that are applied to one or more memory cells, wordlines, bitlines, and/or other portions of a memory array during the programming, reading, and/or erasing of data, perform error correction, and perform other suitable functions.

In various embodiments, the program control logic 124 may be integrated on the same chip as the storage device controller 118 or on a different chip. In the depicted embodiment, the program control logic 124 is shown as part of the storage device controller 118, although in various embodiments, all or a portion of the program control logic 124 may be separate from the storage device controller 118 and communicably coupled to the storage device controller 118. For example, all or a portion of the program control logic 124 may be located on the same package or chip as a memory 116 and/or memory devices 122A-D.

Storage device controller 118 also includes a relocation manager 125 which may include logic to control operations associated with the relocation of data within memory 116. For example, the relocation manager 125 may determine that a relocation operation is to be performed, generate a list of data blocks to be relocated, and interface with program control logic 124 to relocate data in accordance with directives received from the CPU 102. In some embodiments, the relocation manager 125 may be integrated with the program control logic and/or address translation engine 120.

Storage device controller 118 also includes a transfer buffer 127 comprising any suitable volatile or non-volatile memory to temporarily store data that is read from the memory 116 (e.g., during a relocation operation).

In some embodiments, all, or some of the elements of system 100 are resident on (or coupled to) the same circuit board (e.g., a motherboard). In various embodiments, any suitable partitioning between the elements may exist. For example, the elements depicted in CPU 102 may be located on a single die (i.e., on-chip) or package or any of the elements of CPU 102 may be located off-chip or off-package. Similarly, the elements depicted in cache storage device 106 may be located on a single chip or on multiple chips. In various embodiments, a cache storage device 106 and a host computing device (e.g., CPU 102) may be located on the same circuit board or on the same device and in other embodiments the cache storage device 106 and the host computing device may be located on different circuit boards or devices.

The components of system 100 may be coupled together in any suitable manner. For example, a bus may couple any of the components together. A bus may include any suitable interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus. In various embodiments, an integrated I/O subsystem includes point-to-point multiplexing logic between various components of system 100, such as cores 114, one or more memory controllers 111, I/O controller 109, integrated I/O devices, direct memory access (DMA) logic (not shown), etc. In various embodiments, components of computer system 100 may be coupled together through one or more networks comprising any number of intervening network nodes, such as routers, switches, or other computing devices. For example, a host computing device (e.g., CPU 102) and the cache storage device 106 may be communicably coupled through a network.

Although not depicted, system 100 may use a battery and/or power supply outlet connector and associated system to receive power, a display to output data provided by CPU 102, or a network interface allowing the CPU 102 to communicate over a network. In various embodiments, the battery, power supply outlet connector, display, and/or network interface may be communicatively coupled to CPU 102. Other sources of power can be used such as renewable energy (e.g., solar power or motion based power).

Figure 3:
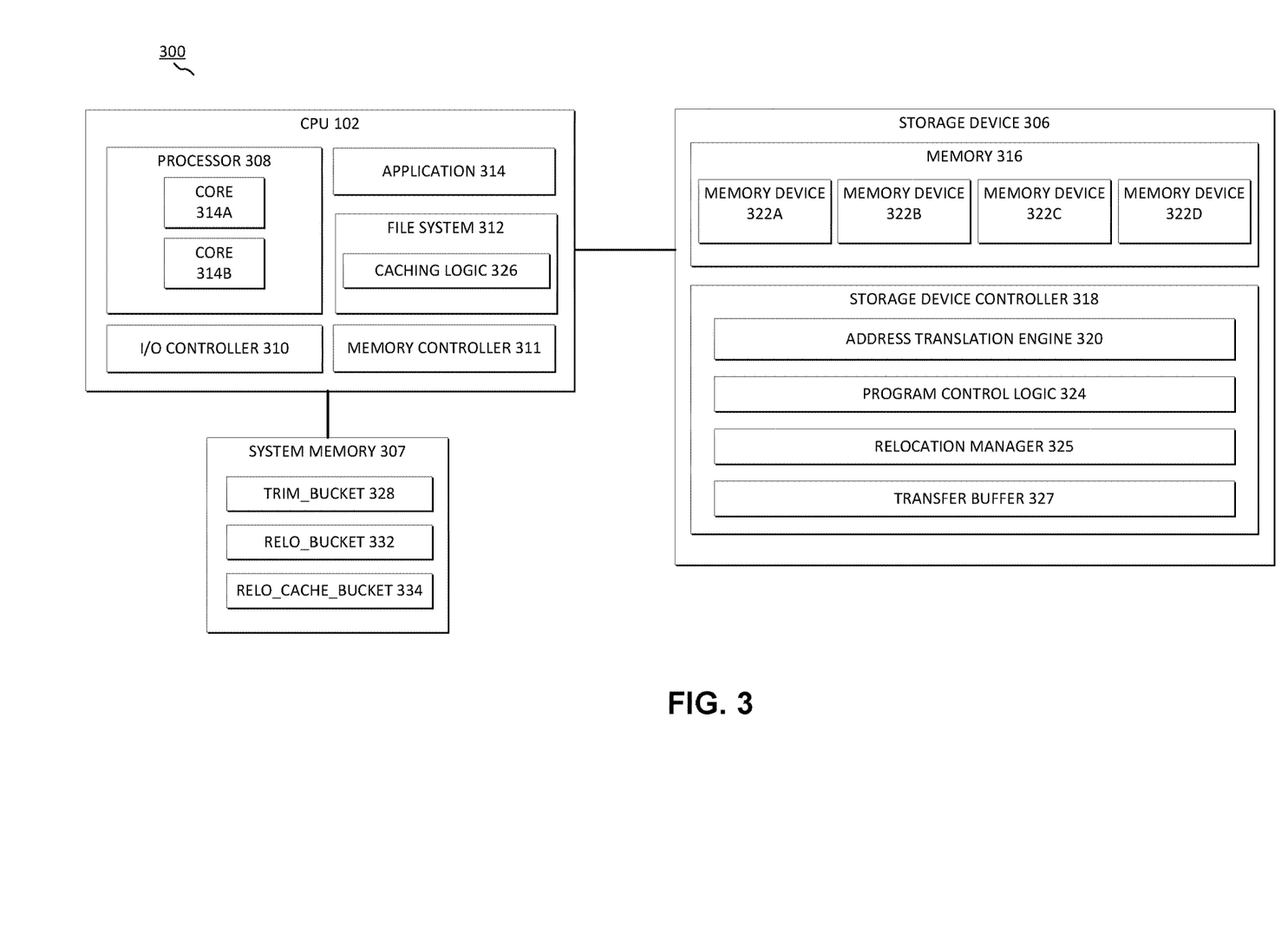
FIG. 3 illustrates a block diagram of a computer system in which relocation information is communicated to a host by a storage device in accordance with certain embodiments.

FIG. 3 illustrates a block diagram of a computer system 300 in which relocation information is communicated to a host (e.g., CPU 302) by a storage device 306 in accordance with certain embodiments. In this embodiment, the storage device 306 is used as the backing store and the system memory 307 is used as the cache. In general, the components of the system 300 may have any suitable characteristics of the corresponding components of system 100.

In this embodiment, instead of a caching controller (e.g., 112), the file system 312 includes caching logic 326 to implement caching functionality and relocation directives described herein. In various embodiments, caching logic 326 (or a subset thereof) may be integrated with the file system 312, included in a driver executed by the CPU 302, or otherwise included in an operating system executed by processor 308. Similar to the cache controller 112, the caching logic 326 may utilize a controller (e.g., I/O controller 310) to communicate with the storage device 306 and system memory 307.

In the embodiment depicted, the buckets used by the caching logic 326 are different from the buckets used when the storage device 306 is used as a cache storage device. While a trim_bucket 328 and a relo_bucket 332 are still used, the other two buckets have been replaced with a relo_cache_bucket 334. In the embodiment depicted, these buckets are stored in system memory 307, although in other embodiments the buckets may be stored in any suitable memory of the system 300, such as a cache of the CPU 302, a storage location dedicated to the buckets, or other suitable memory location.

Figure 4:
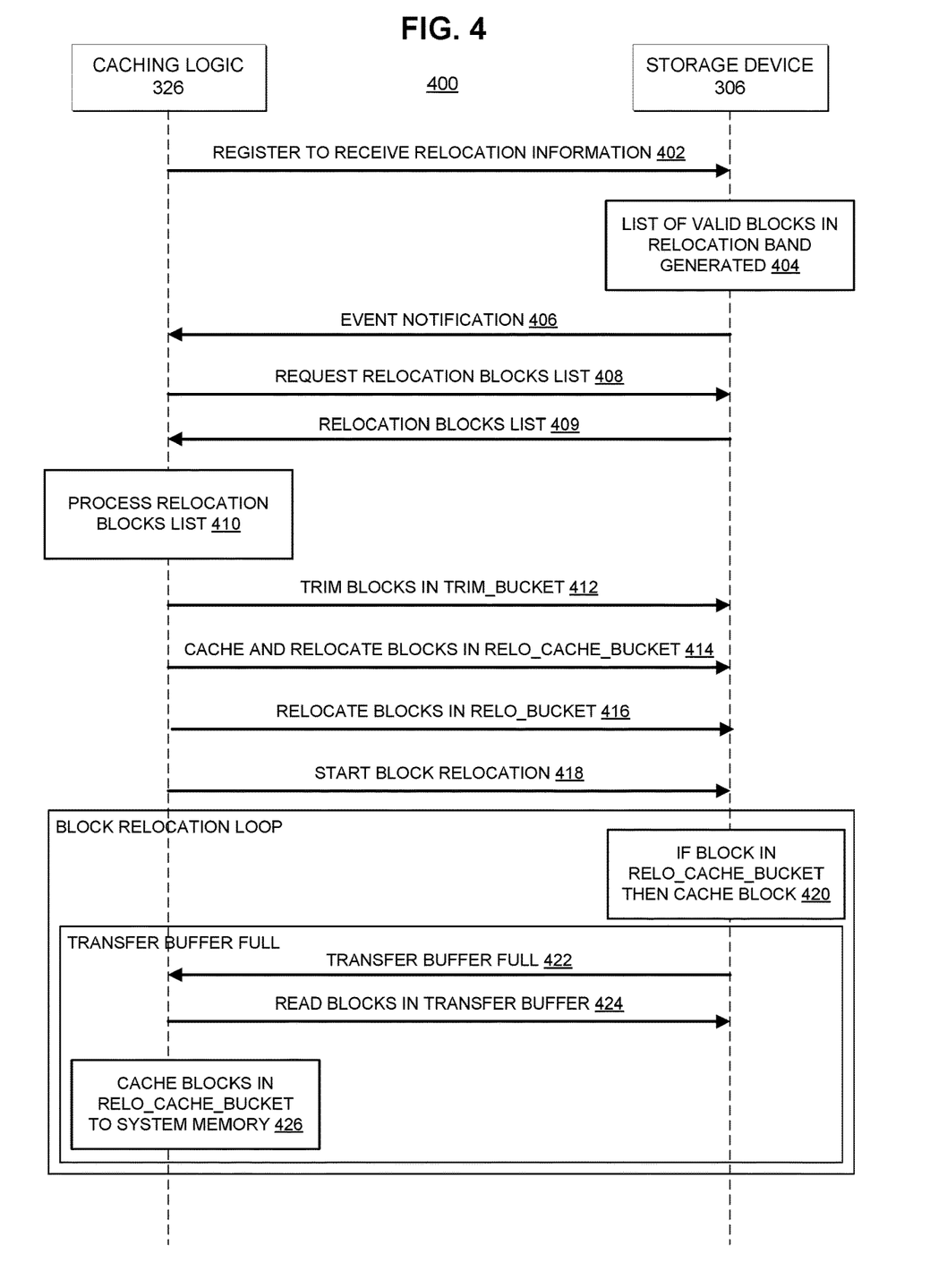
FIG. 4 illustrates an example flow for communicating relocation information from a storage device to a host in accordance with certain embodiments.

FIG. 4 illustrates an example flow 400 for communicating relocation information from a storage device 306 to caching logic 326 of a host (e.g., CPU 302) in accordance with certain embodiments. Operations that are similar to operations of flow 200 may have any suitable characteristics of such operations described above.

The flow begins as the caching logic 326 of the file system 312 registers with the storage device 306 to receive relocation information from the storage device 306 at 402. The registration request may take any suitable format. In one embodiment in which the storage device 306 implements an NVMe interface, the registration request may comprise an Asynchronous Event Request command as described earlier.

At 404, a list of valid blocks in a relocation band are generated. This list may be generated responsive to the triggering of a relocation of data within the storage device 306 (e.g., as part of a defrag operation). The list includes an identification of the blocks that are to be moved during the relocation.

When the storage device 306 triggers a relocation of blocks, it notifies the caching logic 326 and then postpones the relocation until it receives a response including directives for the blocks from the caching logic 326. In some embodiments, if no response is received from the host within a timeout period, the storage device 306 proceeds to relocate the blocks.

At 406, an event notification associated with the relocation of data is sent from the storage device 306 to the caching logic 326. In some embodiments, the event notification may indicate that a list of relocation blocks is available. As an example, when the NVMe interface is used, the controller 318 of the storage device 306 may post a completion queue entry to an Admin Completion Queue when there is an asynchronous event (in this case a list of relocation blocks has been generated) to report to the host.

At 408, the caching logic 326 requests the relocation blocks list from the storage device 306. In one example, when the NVMe interface is used, this request may include a Get Log Page command for a vendor-specific log page that includes the list of relocation blocks. In other embodiments, the request may take any suitable format. At 409, the relocation blocks list is provided to the caching logic 326. In some embodiments, the event notification 406 may alternatively include the list of the relocation blocks (as opposed to a notification that an asynchronous event has occurred), such that caching logic 326 does not need to subsequently request the blocks. After registering, the caching logic 326 may receive a relocation block list from the storage device 306 each time the storage device 306 triggers a relocation.

At 410, the caching logic 326 processes the relocation blocks list. In a particular embodiment, the caching logic 326 may assign each block to be relocated to one of a set of buckets (e.g., by assigning a tag to each block or otherwise associating the assigned bucket with the block).

In the depicted embodiment of FIG. 3, the caching logic 326 assigns blocks to three buckets: trim_bucket 328, relo_bucket 332, and relo_cache_bucket 334. In one embodiment, during processing of the blocks at 410, each block is assigned to one of these buckets.

If the block has been deleted in the file system 312, but has not been trimmed on the storage device 306 (e.g., the CPU 302 has not yet notified the storage device 306 that the block has been deleted via a trim or other command), then the block is assigned to the trim_ bucket 328 for deletion from the storage device 306.

If the block will be utilized by the CPU 302 in the near future, the block is assigned to the relo_cache_bucket 334, to take advantage of the relocation read operation in order to cache the block in the system memory 307. The determination of whether the block will be utilized by the CPU 302 in the near future may be based, e.g., on a prefetching policy of the CPU 302. For example, the CPU 302 (e.g., via caching logic 326) may maintain a list of blocks that are to be prefetched in anticipation of use of such blocks by the CPU 302 (before the blocks are explicitly requested by the CPU 302). If the block being processed appears on this list (or is otherwise determined to be designated for prefetch), then it is placed in the relo_cache_bucket 334.

If the block is not placed into either the trim_bucket 328 or the relo_cache_bucket 334, then the block is placed in the relo_bucket 332.

After processing the buckets, the caching logic 326 instructs the storage device 306 with directives regarding the blocks marked for relocation by the storage device 306. For example, at 412 a request is sent to the storage device 306 to trim the blocks in the trim_bucket 328. As described earlier, a trim command indicates to storage device 306 that the blocks are not needed and thus may be excluded from the relocation.

At 414 a request to cache and relocate the blocks in relo_cache_bucket 334 is sent to the storage device 306. This request instructs the storage device 306 to relocate the blocks in the relo_cache_bucket 134 and to leave the read data corresponding to these blocks in a transfer buffer 327 of the storage device 306 so that they may be read by the CPU 302 without having to read them from their relocated locations (e.g., as described above with respect to flow 200).

At 416, a request to relocate blocks in the relo_bucket 332 is sent to the storage device 306.

After (or concurrent with) providing directives for the blocks in the various buckets, the caching logic 326 then instructs the storage device 306 that it may start block relocation on the remaining valid blocks (e.g., the blocks that were not designated by the caching logic 326 as not needing relocation) at 418.

As the storage device 306 relocates the blocks, it may loop through the blocks checking to see whether the data blocks being relocated are in the relo_cache_bucket 334. If a particular block is in this bucket, then it is cached in the transfer buffer 327 of the storage device 306 during the relocation process. If the transfer buffer 327 is full, then a notification of such is sent to caching logic 326 at 422. If the transfer buffer is not full yet, the loop continues and when an additional block that is assigned to the relo_cache_bucket 334 is encountered, this block may also be read into the transfer buffer, and so on until the transfer buffer is full. Once the caching logic 326 is notified that the transfer buffer 327 is full, the caching logic 326 reads the blocks in the buffer at 424 and then the read blocks are cached in the system memory 307 at 426. If the buffer is not full, but the relocation operation has completed, the storage device 306 may notify the caching logic 326 of such, and the caching logic 326 may read any remaining blocks in the transfer buffer 327 and cache these blocks to the system memory 307.

The flow described in FIG. 4 is merely representative of operations that may occur in particular embodiments. Operations may be performed in any suitable order without departing from the scope of particular embodiments. In other embodiments, additional operations may be performed in the flow. Some of the operations illustrated in FIG. 4 may be repeated, combined, modified, or deleted where appropriate. For example, any one or more of 412, 414, 416, and 418 may be combined within a single command sent from the caching logic 326 to the storage device 306 (which in one embodiment could be an NVMe vendor-specific command). As another example, 412 may be a standard trim command and another command may combine the information of 414, 416, and 418 (e.g., in an NVMe vendor-specific command). In other embodiments, a single command from the caching logic 326 may identify the blocks that are not to be relocated (and thus should be removed from the block relocation list) or the command may identify the blocks that are to be relocated. In some embodiments, that same command (or a different command) may specify which blocks are to be cached during the relocation operation.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disk may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein or as depicted in the FIGS. refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as CPUs 102 and 302, processors 108 and 308, cores 114A, 114B, 314A, 314B, I/O controllers 109 and 310, memory controllers 111 and 311, cache storage device 106, storage devices 110 and 306, system memory devices 107 and 307, cache controller 112, file systems 115 and 312, application 113, caching logic 326, buckets 128, 130, 132, 134, 328, 332, 334, memories 116 and 316, memory devices 122 and 322, memory chips 123, controllers 126, storage device controllers 118 and 318, address translation engines 120 and 320, program control logic 124 and 324, relocation managers 125 and 325, transfer buffers 127 and 327, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 may include an apparatus comprising a controller comprising an interface comprising circuitry to communicate with a host computing device; and a relocation manager comprising circuitry, the relocation manager to provide, for the host computing device, an identification of a plurality of data blocks to be relocated within a non-volatile memory; and relocate at least a subset of the plurality of data blocks in accordance with a directive provided by the host computing device in response to the identification of the plurality of data blocks to be relocated.

Example 2 includes the subject matter of Example 1, wherein the directive provided by the host computing device includes an identification of a data block that does not need to be relocated.

Example 3 includes the subject matter of any of Examples 1-2, wherein the directive provided by the host computing device includes an identification of a data block to be cached in a transfer buffer for retrieval by the host computing device when the data block is read from the non-volatile memory during relocation of the block within the non-volatile memory.

Example 4 includes the subject matter of any of Examples 1-3, wherein the directive provided by the host computing device includes an identification of a data block to be relocated within the non-volatile memory.

Example 5 includes the subject matter of any of Examples 1-4, wherein the directive provided by the host computing device includes an identification of a data block that is to be transferred to the host computing device and relocated within the non-volatile memory.

Example 6 includes the subject matter of any of Examples 1-5, wherein the relocation manager is to provide the identification of the plurality of data blocks responsive to determining to perform a defragmentation operation on a portion of the non-volatile memory.

Example 7 includes the subject matter of any of Examples 1-6, wherein the relocation manager is to provide the identification of the plurality of data blocks to be relocated after receiving a registration request for relocation events from the host computing device.

Example 8 includes the subject matter of Example 7, wherein the registration request for relocation events is a Non-Volatile Memory Express (NVMe) Asynchronous Event Request command.

Example 9 includes the subject matter of any of Examples 1-8, further comprising the non-volatile memory.

Example 10 includes the subject matter of any of Examples 1-9, further comprising the host computing device, wherein the host computing device comprises a central processing unit (CPU).

Example 11 includes the subject matter of any of Examples 1-10, further comprising a battery communicatively coupled to a processor of the CPU, a display communicatively coupled to the processor, or a network interface communicatively coupled to the processor.

Example 12 includes a method comprising determining, by a storage device, to relocate a plurality of data blocks; providing, by the storage device to a host computing device, an identification of the plurality of data blocks to be relocated; and relocating, by the storage device, at least a subset of the plurality of data blocks in accordance with a directive provided by the host computing device in response to the identification of the plurality of data blocks to be relocated.

Example 13 includes the subject matter of Example 12, wherein the directive provided by the host computing device includes an identification of a data block that does not need to be relocated.

Example 14 includes the subject matter of any of Examples 12-13, wherein the directive provided by the host computing device includes an identification of a data block to be cached in a transfer buffer for retrieval by the host computing device when the data block is read from the non-volatile memory during relocation of the block.

Example 15 includes the subject matter of any of Examples 12-14, wherein the directive provided by the host computing device includes an identification of a data block to be relocated.

Example 16 includes the subject matter of any of Examples 12-15, wherein the directive provided by the host computing device includes an identification of a data block that is to be transferred to the host computing device and relocated.

Example 17 includes the subject matter of any of Examples 12-16, further comprising providing the identification of the plurality of data blocks responsive to determining to perform a defragmentation operation on a portion of the non-volatile memory.

Example 18 includes the subject matter of any of Examples 12-17, further comprising providing the identification of the plurality of data blocks to be relocated after receiving a registration request for relocation events from the host computing device.

Example 19 includes the subject matter of Example 18, wherein the registration request for relocation events is a Non-Volatile Memory Express (NVMe) Asynchronous Event Request command.

Example 20 comprises a system comprising means for providing, by a storage device to a host computing device, an identification of a plurality of data blocks to be relocated on the storage device; and means for relocating, by the storage device, at least a subset of the plurality of data blocks in accordance with a directive provided by the host computing device in response to the identification of the plurality of data blocks to be relocated.

Example 21 includes the subject matter of Example 20, wherein the directive provided by the host computing device includes an identification of a data block that does not need to be relocated.

Example 22 includes the subject matter of any of Examples 20-21, wherein the directive provided by the host computing device includes an identification of a data block to be cached in a transfer buffer for retrieval by the host computing device when the data block is read from the non-volatile memory during relocation of the block.

Example 23 includes the subject matter of any of Examples 20-22, wherein the directive provided by the host computing device includes an identification of a data block to be relocated.

Example 24 includes the subject matter of any of Examples 20-23, wherein the directive provided by the host computing device includes an identification of a data block that is to be transferred to the host computing device and relocated.

Example 25 includes the subject matter of any of Examples 20-24, further comprising providing the identification of the plurality of data blocks responsive to determining to perform a defragmentation operation on a portion of the non-volatile memory.

Example 26 includes the subject matter of any of Examples 20-25, further comprising providing the identification of the plurality of data blocks to be relocated after receiving a registration request for relocation events from the host computing device.

Example 27 includes the subject matter of Example 26, wherein the registration request for relocation events is a Non-Volatile Memory Express (NVMe) Asynchronous Event Request command.

Example 28 includes one or more non-transitory computer-readable media with code stored thereon, wherein the code is executable to cause a machine to provide, to a host computing device, an identification of a plurality of data blocks to be relocated on a storage device; and relocate at least a subset of the plurality of data blocks on the storage device in accordance with a directive provided by the host computing device in response to the identification of the plurality of data blocks to be relocated.

Example 29 includes the subject matter of Example 28, wherein the directive provided by the host computing device includes an identification of a data block that does not need to be relocated.

Example 30 includes the subject matter of any of Examples 28-29, wherein the directive provided by the host computing device includes an identification of a data block that should be cached in a transfer buffer for retrieval by the host computing device when the data block is read from a non-volatile memory during relocation of the block.

Example 31 includes the subject matter of any of Examples 28-30, wherein the directive provided by the host computing device includes an identification of a data block that should be relocated.

Example 32 includes the subject matter of any of Examples 28-31, wherein the directive provided by the host computing device includes an identification of a data block that is to be transferred to the host computing device and relocated.

Example 33 includes the subject matter of any of Examples 28-32, further comprising providing the identification of the plurality of data blocks responsive to determining to perform a defrag operation on a portion of a non-volatile memory.

Example 34 includes the subject matter of any of Examples 28-33, further comprising providing the identification of the plurality of data blocks to be relocated after receiving a registration request for relocation events from the host computing device.

Example 35 includes the subject matter of Example 34, wherein the registration request for relocation events is a Non-Volatile Memory Express (NVMe) Asynchronous Event Request command.

What is claimed is:

1. An apparatus comprising:
    a controller comprising:
        an interface comprising circuitry to communicate with a host computing device; and
        a relocation manager comprising circuitry, the relocation manager to:
            receive, from the host computing device, a registration request;
            in response to the received registration request, cause to register the host computing device to receive one or more event notifications indicating that at least one data block in a non-volatile memory is identified for relocation;
            transmit, to the host computing device, an event notification indicating that at least one data block in the non-volatile memory has been identified for relocation;
            receive, from the host computing device, a request for an identification of the at least one data block that has been identified for relocation;
            transmit, to the host computing device, the identification of the at least one data block to be relocated within the non-volatile memory in response to the received request for the identification of the at least one data block;
            receive, from the host computing device, a directive in response to the provided identification of the at least one data block to be relocated;
            in response to the received directive, relocate at least a subset of the at least one data block in accordance with the directive; and
            when a directive is not received within a timeout period in response to the provided identification of the at least one data block to be relocated, relocate each data block of the at least one data block without a directive from the host computing device to relocate each data block of the at least one data block.

2. The apparatus of claim 1, wherein the directive provided by the host computing device includes an identification of a data block that does not need to be relocated.

3. The apparatus of claim 1, wherein the directive provided by the host computing device includes an identification of a data block to be cached in a transfer buffer for retrieval by the host computing device when the data block is read from the non-volatile memory during relocation of the data block within the non-volatile memory.

4. The apparatus of claim 1, wherein the directive provided by the host computing device includes an identification of a data block to be relocated within the non-volatile memory.

5. The apparatus of claim 1, wherein the directive provided by the host computing device includes an identification of a data block that is to be transferred to the host computing device and relocated within the non-volatile memory.

6. The apparatus of claim 1, wherein the relocation manager is to transmit the identification of the at least one data block in response to determining to perform a defragmentation operation on a portion of the non-volatile memory.

7. The apparatus of claim 1, wherein the relocation manager is to transmit the identification of the at least one data block to be relocated after receiving the registration request from the host computing device.

8. The apparatus of claim 1, wherein the registration request is a Non-Volatile Memory Express (NVMe) Asynchronous Event Request command.

9. The apparatus of claim 1, further comprising the non-volatile memory.

10. The apparatus of claim 9, further comprising the host computing device, wherein the host computing device comprises a central processing unit (CPU).

11. The apparatus of claim 10, further comprising a battery communicatively coupled to a processor of the CPU, a display communicatively coupled to the processor, or a network interface communicatively coupled to the processor.

12. A method comprising:
    receiving, by a storage device, a registration request from a host computing device;
    in response to receiving the registration request from the host computing device, causing to register, by the storage device, the host computing device to receive one or more event notifications indicating that at least one data block is identified for relocation;
    determining, by the storage device, to relocate at least one data block;
    transmitting, by the storage device to the host computing device, an event notification indicating that at least one data block in a non-volatile memory has been identified for relocation;
    receiving, by the storage device from the host computing device, a request for an identification of the at least one data block that has been identified for relocation;
    transmitting, by the storage device to the host computing device, the identification of the at least one data block to be relocated within the non-volatile memory in response to receiving the request for the identification of the at least one data block;
    receiving, by the storage device from the host computing device, a directive in response to the provided identification of the at least one data block to be relocated;
    in response to receiving the directive, relocating, by the storage device, at least a subset of the at least one data block in accordance with the directive; and
    when a directive is not received within a timeout period in response to the provided identification of the at least one data block to be relocated, relocating each data block of the at least one data block without a directive from the host computing device for relocating each data block of the at least one data block.

13. The method of claim 12, wherein the directive provided by the host computing device includes an identification of a data block that does not need to be relocated.

14. The method of claim 12, wherein the directive provided by the host computing device includes an identification of a data block to be cached in a transfer buffer for retrieval by the host computing device when the data block is read from the non-volatile memory during relocation of the data block.

15. The method of claim 12, wherein the directive provided by the host computing device includes an identification of a data block to be relocated.

16. The method of claim 12, wherein the directive provided by the host computing device includes an identification of a data block that is to be transferred to the host computing device and relocated.

17. One or more non-transitory computer-readable media with code stored thereon, wherein the code is executable to cause a machine to:
   receive, from a host computing device, a registration request;
   in response to the received registration request, cause to register the host computing device to receive one or more event notifications indicating that at least one data block on a storage device is identified for relocation;
   transmit, to the host computing device, an event notification indicating that at least one data block on the storage device has been identified for relocation;
   receive, from the host computing device, a request for an identification of the at least one data block that has been identified for relocation;
   transmit, to the host computing device, the identification of the at least one data block to be relocated on the storage device in response to the received request for the identification of the at least one data block;
   receive, from the host computing device, a directive in response to the provided identification of the at least one data block to be relocated;
   in response to the received directive, relocate at least a subset of the at least one data block on the storage device in accordance with the directive; and
   when a directive is not received within a timeout period in response to the provided identification of the at least one data block to be relocated, relocate each data block of the at least one data block without a directive from the host computing device to relocate each data block of the at least one data block.

18. The one or more non-transitory computer-readable media of claim 17, wherein the directive provided by the host computing device includes an identification of a data block that does not need to be relocated.

19. The one or more non-transitory computer-readable media of claim 17, wherein the directive provided by the host computing device includes an identification of a data block to be cached in a transfer buffer for retrieval by the host computing device when the data block is read from memory during relocation of the data block.

20. The one or more non-transitory computer-readable media of claim 17, wherein the directive provided by the host computing device includes an identification of a data block to be relocated.

* * * * *